United States Patent
Barnes et al.

(10) Patent No.: US 7,119,458 B2
(45) Date of Patent: Oct. 10, 2006

(54) A/C—D/C POWER SYSTEM WITH INTERNAL FUEL CELL

(75) Inventors: Judith A. Barnes, Troy, NY (US); James T. Bunch, Jr., San Francisco, CA (US)

(73) Assignee: MTI Microfuel Cells, Inc., Albany, NY (US)

( * ) Notice: Subject to any disclaimer, the term of this patent is extended or adjusted under 35 U.S.C. 154(b) by 423 days.

(21) Appl. No.: 10/643,442

(22) Filed: Aug. 19, 2003

(65) Prior Publication Data

US 2005/0040785 A1    Feb. 24, 2005

Related U.S. Application Data

(60) Provisional application No. 60/415,061, filed on Oct. 1, 2002.

(51) Int. Cl.
*H01M 10/44* (2006.01)
*H01M 10/46* (2006.01)
*H02J 7/02* (2006.01)
*H02J 1/10* (2006.01)
*H02J 7/00* (2006.01)

(52) U.S. Cl. .............. 307/65; 307/43; 307/66; 320/101; 320/111

(58) Field of Classification Search .......... 307/65, 307/43, 66; 320/111, 101
See application file for complete search history.

(56) References Cited

U.S. PATENT DOCUMENTS

| | | | |
|---|---|---|---|
| 5,439,756 A | 8/1995 | Anani et al. | |
| 5,587,250 A | 12/1996 | Thomas et al. | |
| 5,670,266 A | 9/1997 | Thomas et al. | |
| 5,736,833 A | 4/1998 | Farris | |
| 5,916,699 A | 6/1999 | Thomas et al. | |
| 6,087,812 A | 7/2000 | Thomas et al. | |
| 6,104,162 A * | 8/2000 | Sainsbury et al. | 320/111 |
| 6,459,171 B1 * | 10/2002 | Leifer | 307/52 |
| 6,492,047 B1 | 12/2002 | Peled et al. | |
| 6,504,339 B1 * | 1/2003 | Parks et al. | 320/101 |
| 6,551,731 B1 | 4/2003 | Berg et al. | |
| 6,559,559 B1 | 5/2003 | Cratty | |
| 6,580,977 B1 | 6/2003 | Ding et al. | |
| 6,583,523 B1 | 6/2003 | Bhate | |
| 6,680,547 B1 * | 1/2004 | Dailey | 307/31 |
| 6,703,722 B1 * | 3/2004 | Christensen | 307/71 |
| 6,787,259 B1 * | 9/2004 | Colborn et al. | 429/23 |
| 6,806,678 B1 * | 10/2004 | Holmes | 320/101 |
| 2003/0165720 A1 * | 9/2003 | DeFilippis | 429/13 |
| 2004/0175598 A1 * | 9/2004 | Bliven et al. | 429/12 |

* cited by examiner

*Primary Examiner*—Lynn Feild
*Assistant Examiner*—Michael Rutland-Wallis
(74) *Attorney, Agent, or Firm*—Cesari and McKenna, LLP

(57) ABSTRACT

An A/C-D/C-F/C power system is provided that includes a portable power unit that can accept electricity from a number of alternative sources including an AC power source, a DC power source, a battery, and a direct oxidation fuel cell. In accordance with one embodiment of the invention, the fuel cell is used to either recharge a battery, or to power an application device, when the AC source and/or the DC source are unavailable. The A/C-D/C-F/C system of the present invention also includes signal processing and signal conditioning circuitry in a power combiner and conditioner, which condition the voltage signal to deliver power to the application device in a manner that is consistent with device requirements.

5 Claims, 3 Drawing Sheets

A/C—D/C POWER SYSTEM WITH INTERNAL FUEL CELL

CROSS-REFERENCE TO RELATED APPLICATION

The present application claims the benefit of U.S. Provisional Patent Application Ser. No. 60/415,061, which was filed on Oct. 1, 2002, by Judith A. Barnes et al. for an A/C-D/C POWER SYSTEM WITH INTERNAL FUEL CELL and is hereby incorporated by reference.

BACKGROUND OF THE INVENTION

1. Field of the Invention

This invention relates generally to battery powered electronic devices, and more particularly, to systems for recharging and maintaining operation of such battery powered electronic devices.

2. Background Information There are a multitude of battery powered devices which are in wide-spread use today including laptop computers, cell phones, personal digital assistants (PDAs), walkie-talkies, cordless power tools, and mobile video and video game systems. These devices typically operate using a battery that is recharged when the device is not in use. Often, the battery is recharged by connecting either the device (or a battery pack for the device) into an external A/C source such as the typical 110 or 220-volt electrical outlet in the consumer's home or office. Many application devices also include an adapter that can connect to a D/C source such as an automobile lighter.

Other devices have been developed that allow a consumer to operate, or recharge, a mobile phone or laptop computer from a PC via a USB port or other electrical connector. Other devices have a solar powered battery charger or backup. Travel packs that can charge a battery by electrically connecting an alternating or direct current power source or a battery to a rechargeable battery have been developed. However, rechargeable batteries are typically kept charged and maintained with the device with which they are to be used, even where no alternating current or direct current sources are available to charge the application battery when it is discharged. This creates problems where the application device user is in traffic, or otherwise does not have access to another source of electricity. The opportunity to make a mobile telephone call, or to send Email messages, or use a PDA, for example, has been lost. The problem may be anything from a mere inconvenience to a life-threatening deficiency, depending on the particular circumstances in which the user finds themselves.

Furthermore, even though many application devices include rechargeable batteries, there is a time element required for a recharge, particularly a full recharge, of the application device batteries. Thus, even though an external power source may be available to recharge a battery, it may not be convenient or possible for the user to tether the device to that external power source at that time.

There are also devices which can provide power or recharge the battery in an application device that utilize a zinc/air fuel cell system that operates without an external power source. Such cells typically can be used for about three charges, or for a quick boost allowing device operation for a short period of time, e.g. one brief phone call or several short Email messages. The zinc/air fuel cells, however, begin to discharge immediately upon exposure to oxygen in the air. Thus, these devices must be kept sealed while not in use, and even then, air leakage into the cartridge can still cause a small, but continual discharge diminishing their effectiveness over time.

There remains a need for an electrical power system that can be used either to operate an application device and/or to recharge a battery in an application device that has the versatility to be used with a conventional electrical outlet, an automobile D/C current source, or an independent power source. It is further desirable if this device can accept a new source of fuel to provide power on an "as needed basis." One way to meet these demands is to integrate into the device components that are capable of accepting alternating and/or direct currents to power an application device, as well as a direct oxidation fuel cell which is also capable of powering the application device or charging the battery associated with the application device.

Recently, there have been developments in direct oxidation fuel cell technology. Fuel cells are devices in which an electrochemical reaction is used to generate electricity. A variety of materials may be suitable for use as a fuel, depending upon the materials chosen for the components of the cell. The zinc air fuel cell mentioned previously is one example of a fuel cell. In the zinc air fuel cell, exposure to air begins the chemical reaction that is used to generate electricity.

Other organic materials such as methanol or natural gas are attractive choices for fuel due to their high specific energy. Direct oxidation fuel cell systems use carbonaceous liquid fuel in an aqueous solution (typically aqueous methanol), which is applied to the anode face of a membrane electrode assembly (MEA). The MEA contains a protonically conductive but, electronically non-conductive membrane (PCM), typically a catalyst which enables direct oxidation of the fuel on the anode is disposed on one surface of the PCM or is otherwise present in the anode chamber of the fuel cell. Upon exposure of the PCM to the methanol solution, protons (from hydrogen found in the fuel) and water molecules create an anodic reaction, thus separating the protons from the electrons. The protons migrate through the PCM, which is impermeable to the electrons. The electrons thus seek a different path to reunite with the protons and oxygen molecules involved in the cathodic reaction and travel through a load, providing electrical power.

This reaction begins when the fuel is introduced into the anode chamber and comes in contact with the anode face of the PCM. The reaction continues as the fuel substance is consumed. Thus, the reaction can be stopped when the fuel is no longer introduced into the anode chamber or upon separation of the fuel delivery source from the fuel cell. Thus, the cell does not continue to provide electricity unless fuel is introduced into the anode chamber.

There remains a further need for such a device that has an independent power source that involves an electricity generating reaction which proceeds and produces electricity when the electricity is needed, and does not discharge or continue producing power when it is not needed.

It is thus an object of the present invention to provide a versatile power system for providing power to an application device (or a battery for an application device) that can be used either with an A/C external source, a D/C external source or an independent power cell, and which does not depend on external environmental factors to operate effectively.

SUMMARY OF THE INVENTION

The disadvantages of prior techniques are overcome by solutions provided by the present invention, which is an A/C-D/C power system including an internal, independently powered fuel cell (herein referred to as an "A/C-D/C-F/C system"). The system includes a portable power unit that can accept electrical current from an alternating current ("A/C") source—typically from a standard electrical outlet; and a direct current ("D/C") source—perhaps from an automobile lighter unit, though other D/C sources may be available. In addition the device also includes a direct oxidation fuel cell, which is an independent source of power that does not need an external connection to generate electricity to provide power, where neither an alternating current or direct current source is readily available. The fuel cell can be utilized when it is necessary or desirable to generate power and no A/C or D/C power source is available, making the A/C/-D/C-F/C system useful under a wide variety of circumstances. The direct methanol fuel cell device consumes fuel on an as-needed basis and therefore does not substantially discharge while not in use and is thus readily available when needed.

The A/C-D/C-F/C system can be used to power the application device, or to recharge a battery within (or connected to) the application device. In accordance with another aspect of the present invention, the A/C-D/C-F/C system may include an internal rechargeable battery (the "charger battery"). The charger battery may be used as a back-up battery should the alternating or direct current sources not be available, and/or if the fuel cell is not generating electricity. The charger battery can be recharged by any of the A/C power source, the D/C power source or the direct oxidation fuel cell, as desired in a particular application. The A/C-D/C-F/C system also includes signal processing and signal conditioning circuitry in a power combiner and conditioner, which condition the voltage signal to deliver power to the application device in a manner that is consistent with the application device's requirements.

In accordance with another aspect of the invention, a modular interface is supplied which can include the functionality for selecting the correct power supply voltage level to deliver to the desired portable electronic device such as mobile telephones, laptop computers, PDAs, mobile video and video game systems, and other electronic devices with data and/or communications functionality, as well as other electrical devices such as flashlights and toys. The interface may have identifying characteristics, which allow the A/C-D/C-F/C system to electrically connect to any number of application devices. One or more units can be supplied with the device of the present invention to connect the A/C-D/C-F/C system of the present invention with the multiple application devices, such as PDAs, laptops and mobile telephones, or may be obtained separately.

In accordance with the method of the present invention, an algorithm is provided to determine which power source or sources will be used to power the application device or recharge the application device's battery or the charger battery. The algorithm may be adjustable by either the OEM or the end user as may be necessary or desirable. A microprocessor suitably programmed to carry out this algorithm is included in the A/C-D/C-F/C system.

BRIEF DESCRIPTION OF THE DRAWINGS

The above and further advantages of the invention will be described in accordance with the accompanying drawings, in which.

DETAILED DESCRIPTION OF AN ILLUSTRATIVE EMBODIMENT

Figure 1:
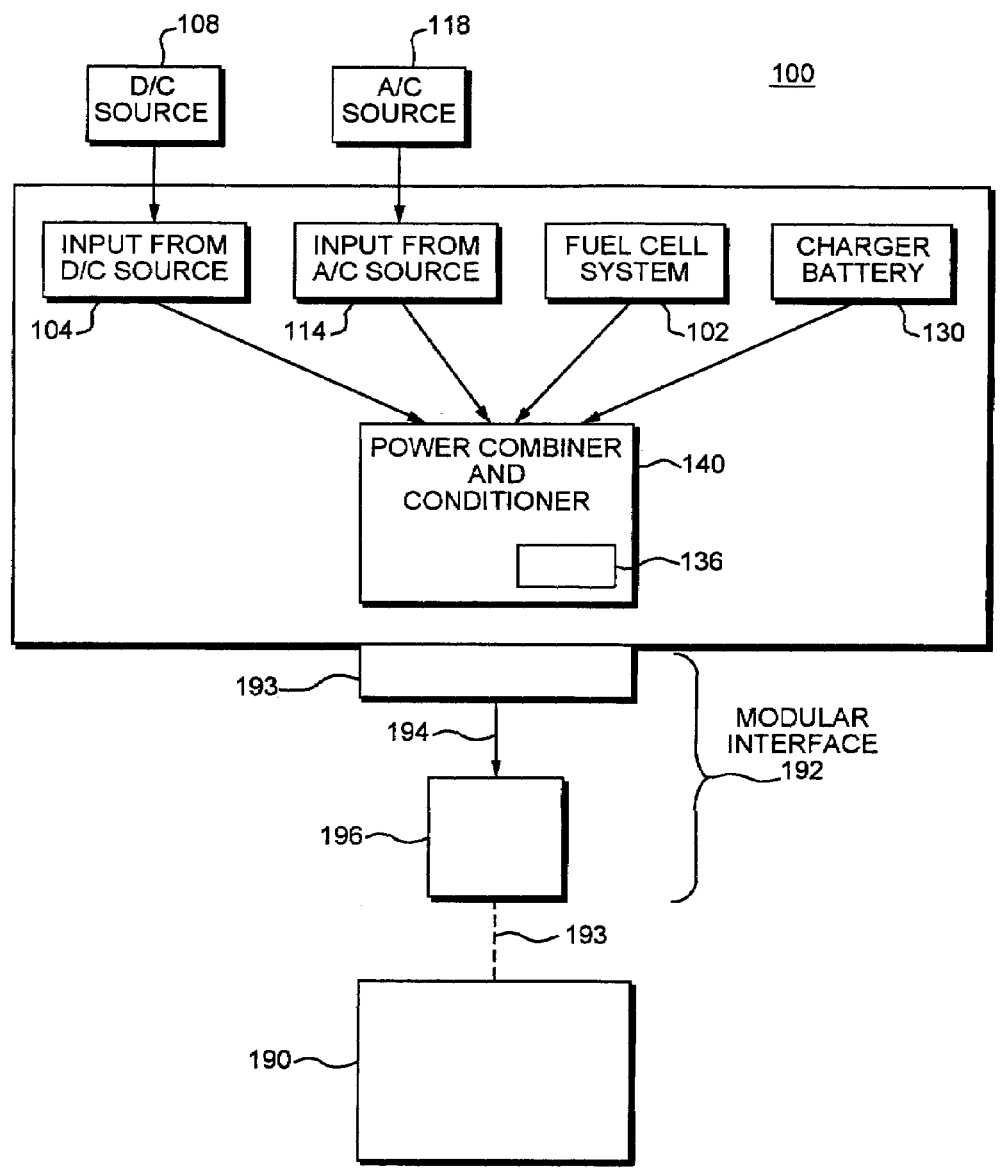
FIG. 1 is a schematic block diagram of the electronic components of the power system of the present invention and coupling components for connection to the application device.

FIG. 1 illustrates an A/C-D/C-F/C unit 100 that includes a direct oxidation fuel cell system 102, which is preferably a direct methanol fuel cell. The A/C-D/C-F/C unit 100 is preferably a portable unit that can be conveniently carried about, though more stationary units also fall within the scope of the invention. The A/C-D/C-F/C unit 100 has as inputs a D/C source input 104 by which the unit 100 may be connected to a direct current source, typically an automobile's cigarette lighter power outlet, as is illustrated in schematic form as block 108 in FIG. 1. The unit 100 also includes an A/C source input 114, by which the unit 100 may be connected to an alternating current source, typically a standard electrical outlet. The A/C input 114 and D/C input electrically connects the unit 100 to an external alternating current source 118 or external direct current source 108, respectively. A/C input 114 and DIG input 104 may be simple electrical connectors.

Power combiner and conditioner 140 receives the D/C current through input 104 or the A/C current at input 114 and can be controlled to switch between the two power sources, as desired. The power combiner or conditioner 140 also includes a converter to convert alternating current to direct current for charging or powering an application device.

A/C-D/C-FIC unit 100 includes a direct oxidation fuel cell system 102 with a fuel cell comprised of a membrane electrode assembly including a protonically conductive, electronically non-conductive membrane electrolyte (PCM) having an anode face and an opposing cathode face, disposed between an anode chamber and a cathode chamber. A catalyst coating is typically disposed upon usually both the anode and the cathode face of the PCM. When the fuel solution included in the fuel cell is introduced to the anode face of the membrane, the anodic disassociation of the fuel cell into carbon dioxide, protons and electrons occurs. A cathodic combination of protons, electrons and oxygen produces water. Protons pass through the membrane and electrons travel through an associated load whereby electric current is collected from the electricity generating reactions to provide electrical current to the load, thus providing the power of the fuel cell system 102. The direct oxidation fuel cell system further comprises fluidic systems and other assemblies and systems that can be used to regulate the operation of the fuel cell system 102. Details about the operation and composition of one direct oxidation fuel cell and fuel cell system may be found in commonly-owned U.S. Pat. NO. 6,924,055, issued Aug. 2, 2005, for a FUEL DELIVERY CARTRIDGE AND ANODIC FUEL RECEPTOR FOR A FUEL CELL, by Hirsch et al., though other direct oxidation fuel cells and fuel cell systems are also within the scope of the invention.

The A/C-D/C-F/C unit 100 of the present invention may further include an internal rechargeable battery 130. The internal battery 130, which may alternatively be another type of power storage device, such as a capacitor or ultra-capacitor, is referred to herein as the "charger battery." It can be used to power the application device or to store power from one of the power sources, namely the fuel cell 102, the D/C source 108 and the A/C source 118. Thus, the internal charger battery 130 may be charging while the device is connected to either one of the external sources 108, 118 so that the battery will be fully charged if the A/C-D/C/-F/C unit 100 is not connected to either a D/C source 108, or an A/C source 118. The charger battery may also be used to conserve fuel in the fuel cell system 102. The fuel cell system 102 can be then used to either charge the internal charger battery 130, to charge the application battery, or to power the application device 190, if no other power source is available.

As discussed in further detail herein, a microprocessor 136, with which there is also additional signal processing and signal condition circuitry and other suitable electronics, are contained within the unit 100, with the additional components being shown schematically as power combiner and conditioner 140. The microprocessor 136 detects the input from the external A/C and D/C power sources (118 and 108 respectively), the internal charger battery 130 and the fuel cell 102. Depending upon which of these power sources is providing a powering function, there may be signal processing or signal conditioning that occurs within the power combiner and conditioner 140 to cause the power signal to be compatible with the specifications of the application device.

The power combiner and conditioner 140 detects whether input signals from any of the power sources exist, and follows a procedure (discussed further herein with reference to FIG. 2) to determine which power source is to supply the power signal to the application device, and depending upon the source chosen, the power combiner and conditioner includes circuitry that appropriately processes and conditions the signal that is to be supplied for powering the application device (i.e. the mobile phone, laptop etc.), and/or for recharging the battery in the application device, or for recharging the internal charger battery 130. The power combiner and conditioner 140 may include electronic circuitry to step down voltages which are too high, to step up voltages that are too low, to filter any unacceptable or unnecessary frequency components, and to otherwise condition the signal so that it is compatible with the specifications of the application device (not shown). The tasks performed by the power combiner and conditioner 140 will depend on the signal from the power source and the power requirements of the application device 190 itself.

In addition to the power combiner and conditioner 140, the A/C-D/C-F/C system 100 of the present invention, in accordance with one embodiment of the invention may include a modular interface 192. The modular interface 192 can be a simple cable or other component that is compatible with both the A/C-D/C-F/C system 100 and he application device 190. The interface 192 is used to connect the system 100 at connector 193 with the application device with which it is to be used. This is discussed in further detail with reference to FIG. 3.

Figure 2:
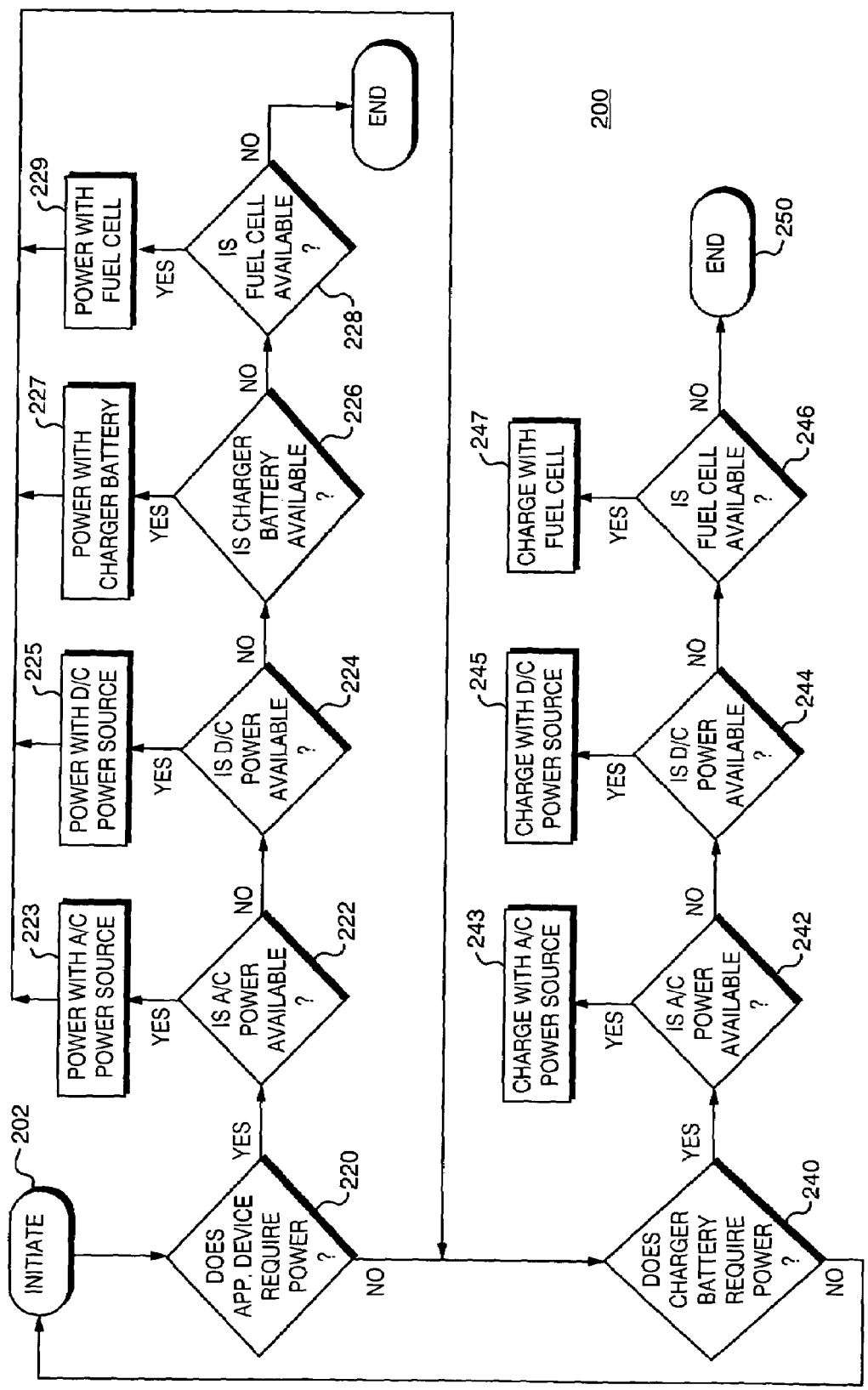
FIG. 2 is a flow chart illustrating the procedure in accordance with the method of the present invention.

Referring now to FIG. 2, the method of the present invention will be described. FIG. 2 illustrates a procedure 200, in which the program is initiated at step 202. Then, in accordance with step 220 the A/C-D/C-F/C system 100, via its power combiner and conditioner 140 determines whether the application device requires power. This also includes determining whether the application battery requires charging. Most application devices include the intelligence and electronics to draw power not only for device operation, but also for internal battery re-charging. Those skilled in the art will recognize that an application device may receive power directly from a power source, or the power may be routed to the application battery associated with the device.

If the application device requires power, for either operation or charging the application battery, or both, then the next step is a choice of the power source in the A/C-D/C-F/C system of the invention. This decision is made based on the availability and predetermined preference of power sources programmed into the system. For example, in procedure 200, the order of preference of power sources to power the application device is, in order of preference, alternating current, direct current, the charger battery, and the fuel cell, respectively. More specifically, if in step 222, alternating current is available to power the application device, then the alternating current source is used to power the device as shown in 223. If instead, an alternating current power source is not available, then a decision takes place at step 224, which determines whether the D/C power source is available, and if so, then the D/C power source is used to power the application device, as illustrated in step 225.

If neither of the A/C power source or the D/C power sources is available to provide power, then the decision tree of procedure 200 proceeds to step 226 to determine whether charger battery power is available, and if so, then the charger battery 130 will be used to power the application device, as shown in step 227. Finally, if there is no alternating or direct current source available, and the charger battery is not available (i.e. the charger battery is insufficiently charged to power the application device), then the availability of the fuel cell is checked at step 228, and if it is available, the application device is powered by the fuel cell (step 229).

Returning to decision step 220 of the procedure 200, after the application device is queried about its power needs, and if necessary, power is supplied to the application device, the procedure continues. If the application does not require power to operate or to charge the application battery, then the procedure continues to step 240 at which it is determined whether or not the charger battery should be charged. If the charger battery is holding an undesirably low charge, then the battery is recharged by passing a current through the charger battery 130. The power source is selected based on the availability and predetermined-programmed preference of power sources. For example, in step 242, the first decision is whether alternating current is available to charge the charger battery, and if so then A/C will be used to charge the application battery, as shown in step 243. If an alternating current power source is not available, then a similar procedure takes place at step 244, and it is determined whether or not D/C power source is available. If the D/C source is available, then as shown in step 245, D/C power is used to charge the internal charger 130. If there is no alternating or direct current source available, then the procedure continues to step 246, and if the fuel cell is available as a power source, then the charger battery can be charged by the fuel cell system 102, as illustrated in step 247.

Once power is being provided to charge the charger battery, regardless of whether power is provided from an alternating current source, a direct current source, or the fuel cell system the procedure ends, and may be reinitiated at step 202.

If the fuel cell system is not available, possibly due to a lack of fuel in the fuel cell system, then the procedure may be terminated, shown as step 250. Following the termination of the procedure, the procedure may be reinitiated at step 202.

It should be understood that, in accordance with this aspect of the invention, the procedure 200 is used for determining the charging of the internal charger battery 130, as well as for direct charging of the application battery, and/or for powering the application device 190 itself, however, the procedure outlined in FIG. 2 can be readily adapted to perform similar steps in a different order, or to omit some functions while performing other functions in a different manner, depending upon the particular application device being used, and upon the wishes of the end user, and these adaptations can be made by reprogramming the microprocessor 136, while remaining within the scope of the invention. For example, the decision tree can be changed to select D/C power, or the fuel cell system as the first priority power supply, if that is desired in a particular application, and this is well within the scope of the present invention.

Another aspect of the invention will be described with reference to FIGS. 1 and 3. As noted herein, the A/C-D/C-F/C power system 100 of the present invention includes a power combiner and conditioner 140 (FIG. 1), and may be coupled to an optional modular interface 192. The power combiner/conditioner 140 prepares the signal that is selected in accordance with the procedure of FIG. 2 to provide power to the intended application device. As will be understood by those skilled in the art, different application devices operate on different power supply voltages, i.e. a typical mobile phone operates on 3.6 volts, a typical personal digital assistant on 5 volts, and a mobile computer on 19.5 volts. Thus, it is desirable that a variety of voltage output levels be available to the end user of the A/C-D/C-F/C power system 100 so that it can be readily employed with any of a number of mobile electronic devices. The power combiner conditioner 140 includes the functionality to provide different power supply voltage levels, while the modular interface may include functionality for selecting which level is to be supplied to a particular application device.

More specifically, there are a variety of ways in which to accomplish this goal. First, a switch (not shown) connected to the power combiner and conditioner 140, by which the user can select the appropriate voltage manually, can be provided on a suitable location on the power system 100.

Another alternative is to include circuitry in the modular interface 192 itself, which performs the voltage conversion. In this case the A/C-D/C-F/C system 100 may have only one voltage output, and each modular interface 192 for a given application device will provide the necessary voltage conditioning. In another embodiment of the invention, a "smart cable" 193 may be provided with the modular interface 192 that includes a set of pins, and predetermined pins are used to provide the desired voltage.

A coupling wire 194 (FIG. 1) that connects to an application device as well as the connector 193 of the A/C-D/C-F/C system 100 with different connectors 196 can be supplied with the system 100 (FIG. 1). For example, a mobile phone typically has a dedicated plug provided with its manufacturer-supplied power supply cord that is inserted into both the phone and a power supply (A/C or D/C, as may be the case) to supply power or to recharge the battery of the mobile phone. A power cable with a dedicated plug that is inserted into the computer, and a plug that connects to an external power source is also typically provided with laptop computers. In accordance with one aspect of the invention, a coupling wire 194 may be supplied with or purchased for the system 100 for each intended application device. Such coupling wires may have dedicated plugs either attached to the wire, or selectably removable plugs and may also have, on an opposite end, a connector that can be plugged into the power system 100 of the present invention.

Figure 3:
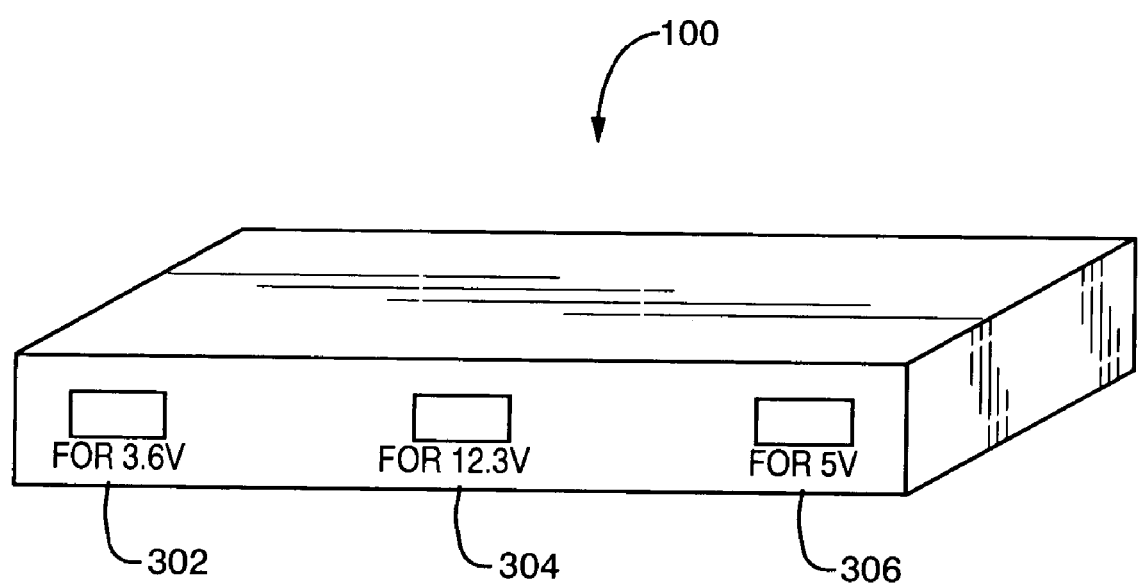
FIG. 3 is an isometric illustration of the A/C-D/C-F/C system of the present invention showing several alternatives for providing various voltage levels that can be supplied by the system to application devices.

Alternatively, and with reference to FIG. 3 power system 100 could include coupling ports 302, 304 and 306. Each port delivers a different power supply voltage for an application device. For example, a first power port 302 might deliver 3.6 v (volts), and the second port 304 may deliver 19.5 v, while the third port (306) is a 5 volt power supply. A coupling wire will include dedicated plugs at both ends of the coupling wire 194, one of which will provide an electrical connection to the A/C-D/C-F/C power system and the other which will provide the appropriate voltage to the application device. In order to prevent a delivery of an inappropriate voltage to a given application device only the connector for that a device requiring the associated voltage will fit into the appropriate port (302, 304 and 306) in the A/C-D/C-F/C system 100. Each port may also have a particular shape, or pin pattern, that couples only with the connector for that port, in order to protect application devices from being supplied with the incorrect voltage. Of course, there are other ways in which the correct voltage may be selected and supplied by the A/C-D/C-F/C system 100, as suggested herein, while remaining within the scope of the present invention.

It should be understood that the present invention provides a simple and efficient system for offering readily available power to an electronic application device such as a laptop computer, a personal digital assistant and/or a mobile phone. The device provides a variety of powering options for hand-held or other portable electronic devices that is versatile and which can provide emergency back up power when external sources are unavailable and even when rechargeable batteries have discharged down below an operating level. The direct oxidation fuel cell contained within the device does not discharge over time without use and thus provides an independent power source that is extremely reliable and available when needed. Thus, it should be understood that the charging system of the present system provides many advantages.

The foregoing description has been directed to specific embodiments of the invention. It will be apparent, however, that other variations and other modifications may be made to the described embodiments with the attainment of some or all of the advantages of such.

What is claimed is:

1.

A method for charging and maintaining the operation of a battery-powered electronic application device, including the steps of:

(A) providing a controllable switching device;

(B) providing a plurality of power sources each coupled to said application device via said controllable switching device, said plurality of power sources including at least two of the following;

(i) an AC power source;

(ii) a DC power source;

(iii) a direct oxidation fuel cell; and (iv) a rechargeable battery; and (C) switching said controllable switching device to select between said plurality of power sources to provide operating power to said application device or to charge said rechargeable battery;

(D) selecting as a primary power source, said AC power source and determining whether said AC power source is available;

(E) if said AC power source is available, selecting said AC power source to power said application device; and (F) if said AC power source is not available, determining whether said DC power source is available and if so, selecting said DC power source to power said application device;

(G) if said DC power source is not available, determining whether said rechargeable battery is sufficiently charged to power said application device and if so, selecting said rechargeable battery to power said application device; and (H) if said rechargeable battery is not sufficiently charged, responsively signaling said direct oxidation fuel cell to begin generating electricity to provide current to power said application device.

2. A system for powering an electronic application device, comprising:

(A) an input adaptable to receive power from an AC power source;

(B) an input adaptable to receive power from a DC power source;

(C) a direct oxidation fuel cell system;

(D) a means by which said system may be electrically connected to said electronic application device;

(E) a switching device connected to said AC input, said DC input and said fuel cell wherein said switching device is operable to select between a first state in which current flows through said switching device from said AC input, a second state in which current flows from said DC input and a third state in which current is drawn from said fuel cell system; and (F) a microprocessor coupled to said switching device and programmed to select between said AC power source, said DC power source and said fuel cell system, depending upon predetermined conditions; and a rechargeable battery connected to said input from said DC source, said input from AC power source and with said fuel cell system, and said microprocessor being programmed to select the rechargeable battery to power the application device if said DC source and said AC source are not available,; wherein said microprocessor is further programmed to signal one of said DC power source, AC power source and fuel cell system to deliver power to charge said rechargeable battery while the application device is connected to one of the other non-selected sources so that the battery will be charged as the application device is being powered.

3. The system as defined in claim 2, further comprising a power combiner and conditioner which is adapted to perform signal processing and signal conditioning to the power source selected by said microprocessor such that the power signal is compatible with the specifications of the application device.

4. The system as defined in claim 2, wherein said direct oxidation fuel cell system includes (A) a fuel source;

(B) a housing;

(C) a direct oxidation fuel cell comprising a protonically conductive, electronically non-conductive membrane electrolyte having an anode aspect and a cathode aspect, and a catalyst coating being disposed on the anode and the cathode aspects such that when fuel is introduced to the anode aspect an anodic disassociation of the fuel into carbon dioxide protons and electrons occurs and a cathodic combination of protons, electrons and oxygen produces water whereby current is produced from the electricity generating reactions to provide current to a load associated with the fuel cell system.

5. The system as defined in claim 4, further comprising a modular interface having a smart cable that includes a set of pins for providing a desired voltage for said application device.

* * * * *